United States Patent

[11] 3,582,956

[72] Inventors Harvey L. Huston
3900 Palmira Lane, Silver Spring, Md. 20906;
Donald K. Belcher, Lexington, Ky.

[21] Appl. No. 743,109
[22] Filed July 8, 1968
[45] Patented June 1, 1971
[73] Assignee said Huston, by said Belcher

[54] APPARATUS FOR RECORDING AND REPRODUCING HANDWRITING
2 Claims, 4 Drawing Figs.

[52] U.S. Cl. .......... 346/33, 346/74, 178/18, 318/568
[51] Int. Cl. .......... G11b 31/00, B43k 29/08
[50] Field of Search .......... 346/33 (MCR); 33/18 (B); 178/18, 19, 20; 318/20, 102; 346/74(Inquired); 35/36; 235/151.11; 340/172.5(Inquired)

[56] References Cited

UNITED STATES PATENTS

| | | | |
|---|---|---|---|
| 2,475,245 | 7/1949 | Leaver et al. .......... | 318/162 |
| 2,537,770 | 1/1951 | Livingston et al. .......... | 318/162 |
| 2,425,140 | 2/1969 | Dillon et al. .......... | 35/36 |

*Primary Examiner*—Joseph W. Hartary
*Attorney*—John J. Byrne

ABSTRACT: Apparatus for recording and reproducing handwriting comprising a tape recorder for recording handwriting signals from the tap of a potentiometer corresponding to movement of a pen in a first direction, from the tap of another potentiometer corresponding to movement of the pen in a second direction perpendicular to the first direction, from a reference supply which supplies signals to the potentiometers, and from a switch corresponding to movement of the pen in a third direction perpendicular to the first and second directions, and pen operating apparatus for reproducing the handwriting in accordance with the signals recorded in the tap recorder.

INVENTORS,
HARVEY L. HUSTON
DONALD K. BELCHER
BY Christen, Sabol & O'Brien
ATTORNEYS INVENTORS.
HARVEY L. HUSTON
DONALD K. BELCHER
BY Christen, Sabol & O'Brien
ATTORNEYS

APPARATUS FOR RECORDING AND REPRODUCING HANDWRITING

BACKGROUND OF THE INVENTION

The present invention pertains to apparatus for recording and reproducing an individual's handwriting and, more particularly, to apparatus cable of automatically writing and/or signing correspondence and other printed material with an individual's handwriting style by utilizing magnetic recording means.

Contemporary politicians and administrative and governmental organizations are dependent on communication with constituents, voters, employees and the public in general by letter; however, form letters without a personal touch are not well received by the ordinary person. Thus, it is desirable to personally sign such letter; however, this is impractical where large volume correspondence is concerned due to the great amount of time involved. In order to remedy this situation many attempts have been made to provide a device capable of recording and reproducing an individual's signature; and, while such devices have had some success, the quality of the reproduced signatures has not been good and the signatures have been readily discernable as automatic reproductions. One disadvantage of the prior device is that they utilize a mechanical matrix recorder which is of great size, and it is difficult and time consuming to change the memory of such recorders.

There are many uses for devices for recording and reproducing handwriting; however, the prior devices have been incapable of fulfilling their potential to provide these uses, which include the ability to add handwritten postscripts to letters, to write entire letters, to write short memos and forms, and to sign checks and other instruments such as stock certificates. The problem of signing stock certificates is particularly acute due to the great volume of trading in stocks and bonds in the United States, all of which must be signed.

Another disadvantage of prior devices is that the mechanical matrix method of recording an individual's handwriting is so complex and time consuming that only one signature of an individual is ordinarily recorded, and thus the human element of error is not present in the handwriting as reproduced and each signature is exactly the same except for machine inaccuracies. This is undesirable in obtaining the personal effect sought by utilizing a handwriting device in the first place, and it is much more desirable to have each signature substantially the same but containing those handwriting differences that are always present and are attributable to the human element when an individual signs his name repeatedly.

SUMMARY OF THE INVENTION

Accordingly, it is an object of the present invention to construct apparatus for recording and reproducing handwriting utilizing magnetic tape storage in order to expedite the recording of the handwriting and the reproducing thereof.

Another object of the present invention is to provide handwriting apparatus capable of writing and signing entire letters and other memoranda.

A further object of the present invention is to provide a device capable of recording and reproducing an individual's handwriting, including the human element of error ordinarily involved therewith.

Another object of the present invention is to utilize a negative feedback in a handwriting reproducing system to stabilize the operation thereof and assure accurate reproductions.

The present invention has another object in that the reference signal utilized in recording an individual's handwriting is recorded so that it may be used in reproducing the handwriting.

The present invention is advantageous over prior handwriting recording and reproducing devices in that recording is accomplished simply and quickly by a tape recorder using magnetic tape, the reference voltage is recorded when the handwriting is recorded and used as a reference voltage in reproducing the handwriting so that no error results from variations in the voltage source or frequency variations caused by faulty tape drive in the tape recorder, and negative feedback is utilized to assure accurate reproduction of the handwriting.

The present invention is summarized in apparatus for recording and reproducing handwriting comprising means for providing record signals corresponding to movement of a support for a writing instrument, a tape recorder for recording the record signals and reproducing the record signals as reproduce signals, and means for moving the writing instrument support in accordance with the reproduce signals to reproduce the initial movement of the writing instrument support.

Other objects and advantages of the present invention will become apparent from the following detailed description of the accompanying drawings.

DESCRIPTION OF THE PREFERRED EMBODIMENT

Figure 1:
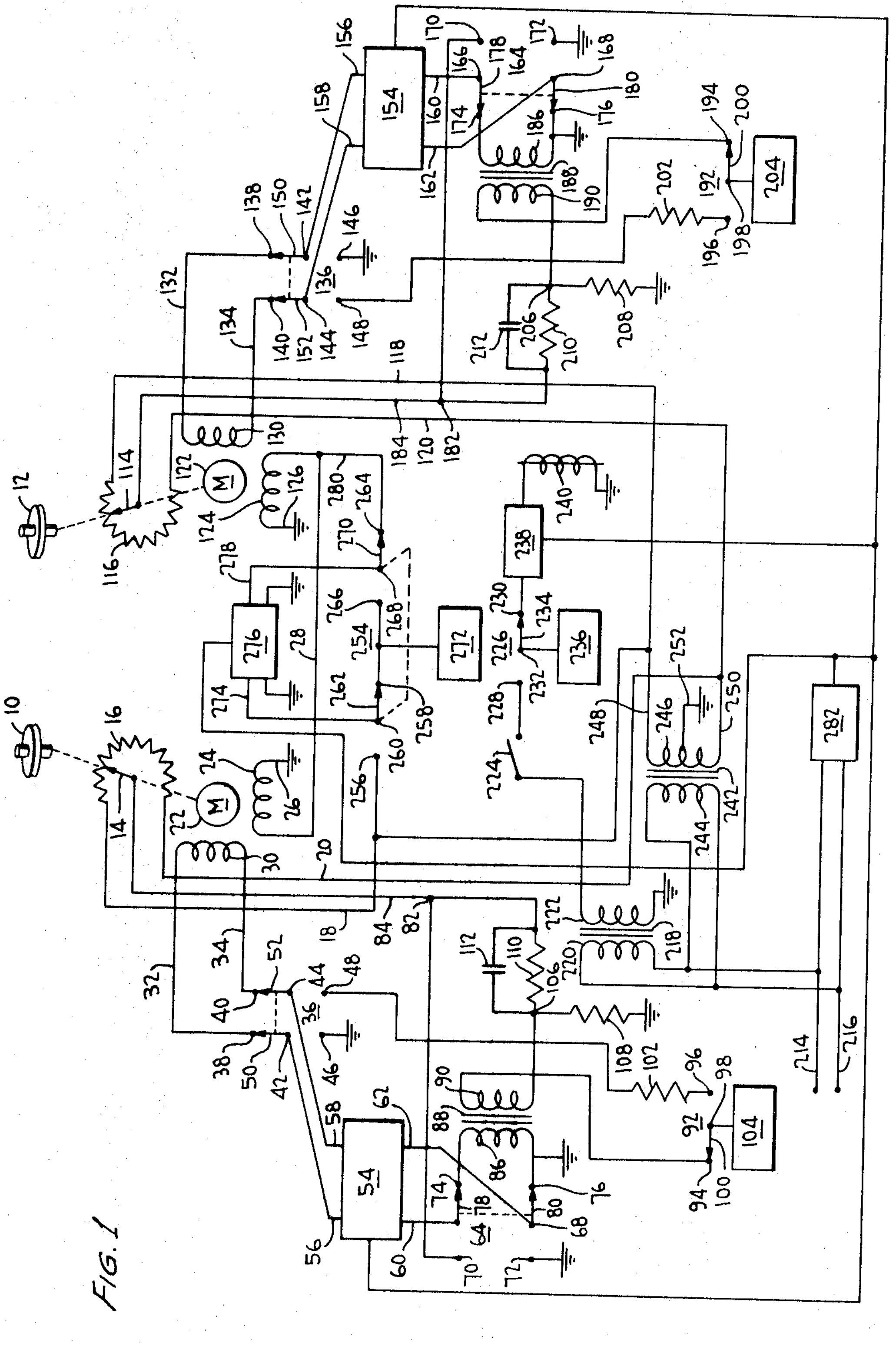
FIG. 1 is a schematic drawing of apparatus used in recording and reproducing electrical signals corresponding to handwriting in accordance with the present invention.

FIG. 1 is a schematic drawing of apparatus for recording and reproducing handwriting in accordance with the present invention. Two drive units 10 and 12 are provided for operating the writing instrument and will be described in detail with respect to FIG. 2.

Drive unit 10 is associated with a first channel 1 and is mechanically connected with a tap 14 of a potentiometer 16 which is connected through leads 18 and 20 to a 60 Hz. AC source. Drive unit 10 is also mechanically connected to the rotor of a conventional two-pole AC servomotor 22. Motor 22 has a reference winding 24 connected through a lead 26 to ground and a lead 28 to means for recording the 60 Hz. AC supply, and a control winding 30 connected through leads 32 and 34 to a double pole, double throw switch 36 at contacts 38 and 40, respectively. Switch 36 includes contacts 38 and 40, poles 42 and 44, contacts 46 and 48, and blades 50 and 52, and an amplifier 54 has its output terminals 56 and 58 connected to poles 40 and 42, respectively. Amplifier 54 has a pair of input terminals 60 and 62 which are connected to a double pole, double throw switch 64 at poles 66 and 68. Switch 64 includes poles 66 and 68, contacts 70 and 72, contacts 74 and 76 and blades 78 and 80. Contacts 72 and 76 are grounded, contact 70 is connected through a junction 82, and a lead 84 to tap 14, and contact 74 is connected to a secondary winding 86 of a transformer 88 having a primary winding 90. Primary winding 90 has one terminal connected to a single pole, double throw switch 92 at a contact 94. Switch 92 includes contacts 94 and 96, a pole 98 and a blade 100, and contact 96 is connected through a resistor 102 to contact 48 of switch 36. Pole 98 is connected to a conventional tape head 104 for recording and reproducing electrical signals. The other terminal of primary winding 90 is connected to ground through junction 106 and resistor 108 and to junction 82 through the parallel combination of a resistor 110 and a capacitor 112.

Drive unit 12 is associated with a second channel 2 and is mechanically connected with a tap 114 of a potentiometer 116 which is connected through leads 118 and 120 to a 60 Hz. AC supply, and a control winding 130 connected through leads 132 and 134 to a double pole, double throw switch 136 at contacts 138 and 140, respectively. Switch 136 includes contacts 138 and 140, poles 142 and 144, contacts 146 and 148 and blades 150 and 152, and an amplifier 154 has its output terminals 156 and 158 connected to poles 140 and 142, respectively. Amplifier 154 has a pair of input terminals 160 and 162 which are connected to a double pole, double throw switch 164 at poles 166 and 168. Switch 164 includes poles 166 and 168, contacts 170 and 172, contacts 174 and 176 and blades 178 and 180. Contacts 172 and 176 are grounded, contact 170 is connected through a junction 182 and a lead 184 to tap 114, and contact 174 is connected to a secondary winding 186 of a transformer 188 having a primary winding 190. Primary winding 190 has one terminal connected to a single pole, double throw switch 192 at a contact 194. Switch 192 includes contacts 194 and 196, a pole 198 and a blade 200, and contact 196 is connected through a resistor 202 to contact 148 of switch 136. Pole 198 is connected to a conventional tape head 204 for recording and reproducing electrical signals. The other terminal of primary winding 190 is connected to ground through junction 206 and resistor 208 and to junction 182 through the parallel combination of a resistor 210 and a capacitor 212.

Leads 214 and 216 are adapted to be connected to any conventional available source of electricity such as a 110 volt, 60 Hz. AC source. A transformer 218 has a primary winding 220 connected across leads 214 and 216 and a secondary winding 222 having one terminal grounded and the other terminal connected through a switch 224 to a single pole, double throw switch 226 at a contact 228. Switch 226, which is associated with a third channel 3, includes contacts 228 and 230, a pole 232 and a blade 234. Pole 232 is connected to a conventional tape head 236, for recording and reproducing electrical signals, and contact 230 is connected to the input of an amplifier 238 which has its output coupled to ground through a solenoid 240.

A transformer 242 has a primary winding 244 connected across leads 214 and 216 and a secondary winding 246 having terminals 248 and 250 connected with leads 18 and 20 of potentiometer 16 and leads 118 and 120 of potentiometer 116 and having a grounded center tap 252. Terminal 248 is also connected to a double pole, double throw switch 254 at a contact 256. Switch 254 includes contacts 256 and 258 associated with a pole 260 and a blade 262 and contacts 264 and 266 associated with a pole 268 and a blade 270. Contacts 258 and 256 are coupled together and to a conventional tape head 272 associated with a fourth channel 4 for recording and reproducing electrical signals. Pole 260 leads to an input 274 of an amplifier 276, and amplifier 276 has an output 278 leading to pole 268. Contact 264 is connected through a lead 280 to leads 28 and 128 of reference windings 24 and 124 of servomotors 22 and 122, respectively.

An AC to DC converter 282 is coupled across power leads 214 and 216 and has its DC output coupled to amplifiers 54, 154, 238 and 276 to provide DC bias voltage therefor. Converter 282 is conventional and may comprise a simple full wave rectifier and smoothing network.

Amplifiers 54, 154 and 276 for channels 1, 2, and 4, respectively, may comprise any conventional AC amplifier having the capability of accurately amplifying a 60 Hz. signal, a voltage gain of approximately 100 decibels, and a capability of supplying a few watts of power to drive the servomotors. Amplifier 238 may be a conventional transistorized AC amplifier capable of operating solenoid 240 with a small millivolt signal from tape head 236. Servomotors 22 and 122 are conventional and F. L. Mosely Company, Type A-10475 or the equivalent may be used therefor. Tape heads 104, 204, 236, and 272 are part of a conventional four track or channel tape recorder such as Wright and Weaire Ltd., Type 6C. All the above noted components of the combination of the present invention are conventional, and the types listed are for example only since it is clear that many different amplifiers, servomotors, and tape recorders may be used with the present invention.

Figures 2, 3, 4:
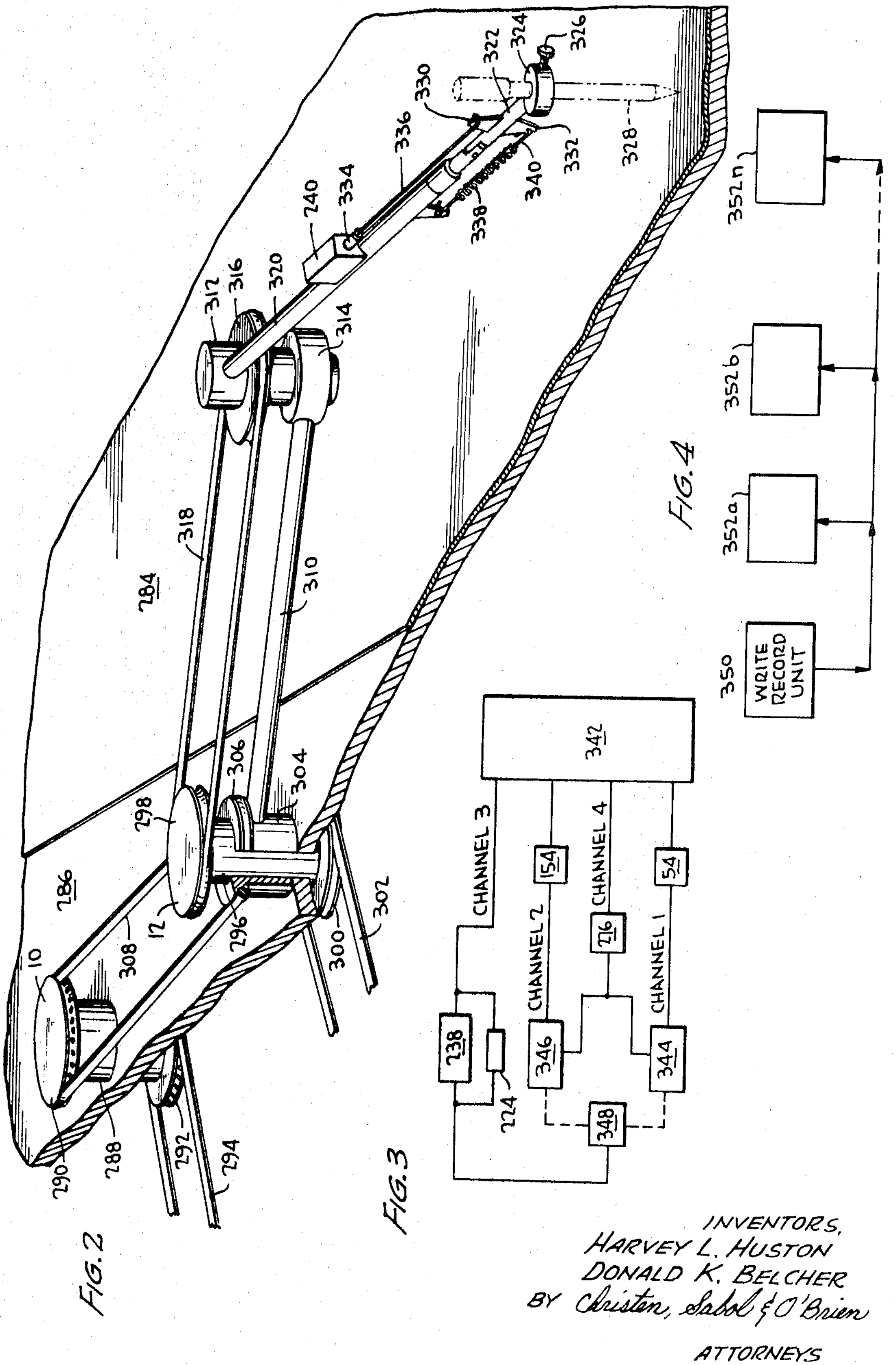
FIG. 2 is a perspective view, partially in section, of pen operating apparatus for use in the present invention.
FIG. 3 is a block diagram of the present invention.
FIG. 4 is a block diagram of a master-slave embodiment of the present invention.

A perspective view of pen operating apparatus for use with the present invention is shown in FIG. 2. A sheet of paper 284 to be written upon is supported on a flat writing table 286 which may have edges corresponding to Cartesian coordinates. Drive unit 10 includes a cylindrical, spoollike member 288 having grooved top and bottom peripheral portions 290 and 292, respectively. Member 288 is rotatably supported on table 286 and is adapted to be rotatably driven by servomotor 22 via a belt 294 which is received in grooved portion 292. Drive unit 12 includes a cylindrical, spoollike member 296 having grooved top and bottom peripheral portions 298 and 300, respectively. Member 296 is rotatably supported on table 286 and is adapted to be rotatably driven by servomotor 122 via a belt 302 which is received in grooved portion 300. A cylindrical, rotatably mounted member 304 is disposed around member 296 and has a grooved peripheral portion 306 disposed the same distance above table 286 as grooved portion 290 of drive unit 10 to enable member 304 to be rotatably driven by drive unit 10 via a belt 308 received in grooved portions 290 and 306. Drive units 10 and 12 are stationary on table 286, and a support rod 310 is secured to member 304 so that it swings over table 286 as member 304 rotates.

A cylindrical member 312 is rotatably supported by a cylindrical housing 314 that is firmly secured to support rod 310 and member 312 has a grooved peripheral portion 316 aligned with grooved portion 298 so that member 312 may be rotatably driven by drive unit 12 via a belt 318 that is received in grooved portions 298 and 316. A support rod 320 is firmly secured to member 312 and is pivotally connected with a writing instrument or pen supporting rod 322 that fits inside the end of support rod 320. A ringlike holder 321 is attached to the end of support rod 322 and has a set screw 326 disposed therein for securing a writing instrument such as a pen 328 shown in phantom. Two flanges 330 and 332 are disposed on the upper and lower sides of pen supporting rod 322, respectively, and each flange has an aperture in the narrow end thereof. Solenoid 240 is supported on rod 320 and has an armature 334 connected with the aperture of flange 330 by a wire 336. A spring 338 has a first end secured to rod 320 and a second end connected by a wire 340 to the aperture of flange 332. Switch 224, shown in FIG. 1, may be connected with the pen operating apparatus in any conventional manner to sense when pen 328 is in contact with paper 284, such as by sensing the tension on wire 336 or spring 338.

The operation of FIGS. 1 and 2 will be explained with the aid of FIG. 3 which is a block diagram of the basic system of the present invention. A conventional four track tape recorder is indicated at 342 and is connected through channels 1, 2, 3, and 4 to the remainder of the system. Channel 1 includes amplifier 54 and a control unit 344 for controlling the left-to-right or abscissa movement of pen 328, and channel 2 includes amplifier 154 and a control unit 346 for controlling up and down or ordinate movement of pen 328. Channel 3 includes amplifier 238 for controlling the write and nonwrite states of pen 238, and channel 4 includes amplifier 276 for providing the same reference signal when reproducing handwriting as when recording the handwriting. Control units 344 and 346 include drive units 10 and 12, respectively, and their associated apparatus such as servomotors 22 and 122 and potentiometers 16 and 116, and the direct support and control unit for the writing instrument is indicated as 348. Unit 348 includes the pen supporting apparatus driven by drive units 10 and 12, as shown in FIG. 2, solenoid 240 and switch 224, which is shown separately in FIG. 3.

Basically, the operation of the present invention is such that when it is desired to record an individual's handwriting, the individual grasps pen 328 and writes his signature, a letter or whatever is to be recorded and reproduced. The movement of pen 328 is converted to electrical signals in units 344 and 346 of channels 1 and 2 which signals are amplified by amplifiers 54 and 154 and supplied to tape recorder 342. The reference signal utilized in deriving the signals for channels 1 and 2 is amplified by amplifier 276 of channel 4 and supplied to tape recorder 342, and signals corresponding to the position of pen 328 in the write and nonwrite states are supplied to tape recorder 342 by switch 224 which breaks when pen 328 is lifted off the paper into the nonwrite position. Tape recorder 342 uses four track magnetic tape so that the signals in each of channels 1, 2, 3, and 4 are recorded simultaneously and can be reproduced simultaneously. Thus, it can be seen that the amount of material that can be recorded is unlimited in that when a reel of tape is fully recorded it may be replaced by a clean reel.

In order to reproduce whatever has been previously written, the signals on the tape are amplified in each of the channels and the signals in channel 1 are applied to unit 344 to control the abscissa movement of pen 328, the signals in channel 2 are applied to unit 346 to control the ordinate movement of pen 328, the signals in channel 3 are applied to control unit 348 to control the contact of pen 328 with the paper and the signals in channel 4 are applied to control units 344 and 346 to assure that the reference signals utilized in reproducing the handwriting are the same as those used when the handwriting was recorded to thereby prevent inaccuracies stemming from variations in the AC supply voltage and frequency variations caused by faulty tape drive in tape recorder 342.

The operation of the present invention will now be explained with respect to FIGS. 1 and 2. Switches 36, 64, 92, 136, 164, 192, 226, and 254 are shown in FIG. 1 in the states required for the system to be in the reproduce position, and they may all operate from a common shaft.

When the system is in the recorded position, all of the above noted switches assume their opposite states in response to the common shaft. Pen 328 is moved by the individual whose handwriting is to be recorded, and an upward stroke of the pen causes member 312 to rotate counterclockwise, as viewed from the top, which causes member 296 to rotate counterclockwise via belt 318. The rotation of member 296 causes tap 114 to move a corresponding distance in one direction on potentiometer 116 in any conventional manner such as by gearing associated with member 296 or means associated with the movement of belt 302. Similarly, a downward stroke of pen 328 causes clockwise rotation of members 312 and 296 and corresponding movement of tap 114 in the opposite direction. Lateral movement of pen 328 is transmitted to tap 14 in a similar manner; that is, a movement of pen 328 to the left causes member 304 to rotate counterclockwise due to the movement of supporting rod 310, and the rotation of member 304 causes a similar rotation of member 288. Tap 14 moves correspondingly due to conventional apparatus such as gearing associated with member 288 or means associated with the movement of belt 294. Similarly, a movement of pen 328 to the right causes clockwise rotation of members 304 and 288 and corresponding movement of tap 14 in the opposite direction.

The movement of taps 14 and 114 are utilized to provide electrical signals for recording as follows. The voltage applied to terminals 18 and 20 and 118 and 120 is derived from transformer 242, and due to center tap 252 the voltage at either terminal of potentiometers 16 and 116 is of opposite polarities with respect to ground, thereby permitting the voltages sensed by taps 14 and 114 with respect to ground to be either positive or negative as well as varying in absolute magnitude to indicate both direction and distance of pen movement, respectively.

Since channels 1 and 2 are identical, the operation of only channel 1 will be described with the understanding that channel 2 operates in the same manner. The voltage sensed at tap 14 is applied to input 60 of amplifier 54 through lead 84, junction 82, and switch 64, and the voltage at output 58 of amplifier 54 is delivered to tape head 104 through switch 36, resistor 102 and switch 92 to be recorded on magnetic tape. Thus, signals are recorded at tape heads 104 and 204 corresponding to the direction and distance of movement of pen 328.

Simultaneously, the reference voltage applied across potentiometers 16 and 116 is being recorded through the left-hand side of switch 254, input 274 and output 278 of amplifier 276 and the right-hand side of switch 254 to tape head 272, and the movement of pen 328 with respect to lifting it from the paper (i.e. from the write position to the nonwrite position) is recorded at tape head 236 from transformer 218 through switch 226 by the making of switch 224 when the pen is lifted and the breaking of switch 224 when the pen is replaced on the paper.

In the above manner a single signature or many signatures, for instance 50, or a letter or a memo may be recorded on magnetic tape using a single tape recorder housing tape heads 104, 204, 236, and 272. Thus, if 50 signatures are recorded, 50 variations of signatures are available to give the reproduced correspondence the appearance of being personally signed.

In the reproduced position, all of the switches will be in the position shown in FIG. 1. Since channels 1 and 2 are identical, only the operation of channel 1 will be described with the understanding that channel 2 operates in the same manner. The signals recorded on the magnetic tape are reproduced at tape head 104 and applied to input 60 of amplifier 54 through transformer 88, and the output of amplifier 54 is fed to control winding 30 of servomotor 22 is supplied with the identical voltage applied across potentiometers 16 and 116 when the handwriting was recorded by reproducing that voltage at tape head 272, amplifying it at amplifier 276 and applying it to reference windings 24 and 124 through switch 254 and lead 280. Thus, the usual error caused by variations in supply voltage and frequency variations caused by faulty tape drive in the tape recorder are avoided in the present invention by recording and reusing the reference voltage.

Solenoid 240 is operated to control the contact of pen 328 with the paper in accordance with the signals from tape head 236 as amplified by amplifier 238. Spring 338, shown in FIG. 2, renders pen 338 normally in contact with the paper due to its pivotal effect on pen supporting rod 322, and the pressure of pen 328 against the paper may be adjusted by adjusting the tension on spring 338.

The control of the direction and distance of movement of pen 328 is accomplished as follows. Servomotors 22 and 122 are controlled by the phase and magnitude of the signals supplied to their respective control windings 30 and 130, and the movement of the rotors of servomotors 22 and 122 drive belts 294 and 302, respectively. For instance, when the rotor of servomotor 22 rotates clockwise, belt 294 is driven so as to cause member 288 to rotate clockwise which in turn rotates member 304 clockwise. The rotation of member 304 moves supporting rod 310 to the right which causes pen 328 to make a stroke to the right if solenoid 240 is not energized. Similarly, at the same time, the rotor of servomotor 122 may be rotating counterclockwise to drive member 296 counterclockwise via belt 302 which in turn causes member 312 to rotate counterclockwise to cause pen 328 to make a stroke up, and the combined effect on pen 328 will be to draw a line up and to the right. If the phase of the signals applied to the control windings of the servomotors is the opposite of the signals just described, the rotors of servomotors 22 and 122 will rotate oppositely than just described, and thus it can be seen that pen 328 is capable of drawing any particular line at any place on the paper and in any sequence. For instance, if when recording a signature, the individual goes back to cross a *t* or dot an *i* after he has finished signing his name, the device of the present invention will perform the same function in the same sequence.

An added feature of the present invention is the use of negative feedback to stabilize the system. That is, in the reproduce position taps 14 and 114 are connected to secondary windings 90 and 190 of transformers 88 and 188, respectively, in such a manner that the signals on taps 14 and 114, which signals are derived from the movement of pen 328 in the same manner as when the system is in the record position, are subtracted from the signals from tape heads 104 and 204, respectively.

FIG. 4 depicts in block form a master-slave system incorporating the present invention. A master write-record unit 350 such as that shown in detail in FIGS. 1 and 2 and in block form in FIG. 3 is provided and a plurality of slave units 352*a*, 352*b*,...352bn, each including the pen operating apparatus shown in FIG. 2 along with servomotors 22 and 122 and suitable receiving circuitry for receiving the signals in channels 1, 2, 3, and 4 of master unit 350 by direct connection or by conventional communication links, are responsive to the signals generated when the master unit is in the reproduce position to reproduce the recorded handwriting. Where the slave units are not remote from the master unit, the servomotors may be omitted from the slave units and the servomotors of the master unit may drive the drive units in each slave unit. By utilizing the master-slave system of FIG. 4 the speed of reproduction can be increased in accordance with the number of slave units and handwriting may be reproduced in one or more remote locations.

The present invention has been shown and described in a general manner; however, it should be clear that the many modifications and changes which would occur to a person of ordinary skill in the art are intended to be within the scope of the present invention. For example, in practice the grooved portions of members 288, 296, 304 and 312 will have needlelike protrusions extending therefrom if a belt drive is used in order to prevent slippage. Furthermore, table 286 may be designed in a conveyor fashion to permit the automatic supply of paper to be written upon, and if the letters to be signed are typed beforehand they may be fed to table 286 from the bottom thereof so that sensing means can assure that the signature is correctly placed on each letter even though they are of different lengths.

The present invention is not intended to be limited to the pen operating apparatus shown in FIG. 2 since other methods of translating the electrical reproduce signals into pen movement may be utilized. One modification of the pen operating apparatus of FIG. 2 is the use of gear drive instead of belt drive. That is, it is understood that the rotation of the rotors of servomotors 22 and 122 may be altered by gears to provide the desired corresponding rotation of members 288 and 296; however, gears may also be utilized in place of belts 294, 302, 308 and 318 to provide a more compact and nonslipping device. Also, solenoid 240 may be modified so that it permits spring 338 to lower pen 328 slowly to prevent smudging or blotting of ink on the paper.

Any conventional writing instrument such as a fountain or ball point pen, or lead pencil may be used with the present invention as well as writing instruments specially made for automatic writing, such as ink pens having an ink supply attached thereto through a conduit to avoid time loss in refilling the pens.

Any direction of writing can be recorded and reproduced by the present invention, and thus a written insert along the side of a page or at an angle may be reproduced thereby giving the present invention great versatility which may be utilized by modifying the table structure.

Since the present invention is subject to many variations, modifications and changes in detail, it is intended that all matter contained in the foregoing description or shown in the accompanying drawing shall be interpreted as illustrative and not in a limiting sense.

What we claim is:

1. In an apparatus for recording and reproducing handwriting comprising,
- a writing instrument,
- support means to support said writing instrument for movement in three directions,
- means for sensing the movement of said supporting means comprising a first potentiometer sensing the first direction of movement, a second potentiometer sensing the second direction of movement and switch means sensing the third direction of movement,
- second means for causing movement of said support means comprising a first servomotor for causing movement in a first direction, a second servomotor for causing movement in a second direction and motive means for causing movement in a third direction, said servomotors being mechanically linked to said potentiometers and each having a reference winding and a control winding,
- a source of reference signals,
- tape recorder means comprising a first recording head recording the first direction of movement,
- a second recording head recording the second direction of movement,
- a third recording head recording the third direction of movement,
- and a fourth recording head for recording the reference signals,
- circuit means having a recording state and a reproducing state for connecting during the said recording state,
- said first potentiometer to said first recording head,
- said second potentiometer to said second recording head, and
- said reference source to said first and second potentiometer and to said third recording head controlled by said switch means and to said forth recording head,
- said circuit means during said reproducing state connecting said first head to said control winding of said first servomotor,
- said second recording head to said control winding of said second servomotor,
- said third recording head to said motive means,
- and said fourth recording head to said reference windings of said first and second servomotor.

2. The invention as recited in claim 1 wherein said circuit means includes negative feedback paths interconnecting said first potentiometer to said first servomotor, and said second potentiometer to said second servomotor when said circuit means is in said reproduce state.